United States Patent [19]
Micka

[11] 3,908,118
[45] Sept. 23, 1975

[54] CROSS CORRELATION ANOMALY DETECTION SYSTEM

[75] Inventor: Ernest Z. Micka, LaCanada, Calif.

[73] Assignee: California Institute of Technology, Pasadena, Calif.

[22] Filed: Sept. 27, 1973

[21] Appl. No.: 401,225

[52] U.S. Cl. ............ 235/181; 235/151.3; 235/156; 250/572; 356/237
[51] Int. Cl. ..................... G06f 15/34; G01n 21/32
[58] Field of Search ..................... 235/181, 151.3; 340/149.3 Q; 356/209, 238, 237; 250/556, 557, 562, 563, 572

[56] References Cited
UNITED STATES PATENTS

| | | | |
|---|---|---|---|
| 3,659,950 | 5/1972 | Troll et al. | 356/238 |
| 3,688,267 | 8/1972 | Iijima | 340/146.3 Q |
| 3,715,165 | 2/1973 | Smith | 356/209 |

OTHER PUBLICATIONS
IBM Technical Disclosure Bulletin; Tynan: Integrated Circuit Mask Inspection Technique. Vol. 11, No. 12, May 1969, p. 1695–1696.
IBM Tech. Discl. Bull., Laming et al., Mask defect inspection by Holograms, Vol. 14, No. 1, June 1971, p. 28–29.

*Primary Examiner*—Felix D. Gruber
*Attorney, Agent, or Firm*—Lindenberg, Freilich, Wasserman, Rosen & Fernandez

[57] ABSTRACT

This invention provides a method and means for automatically inspecting the surface of an object, such as an integrated circuit chip, whereby the data obtained by the light reflected from the surface, caused by a scanning light beam, is automatically compared with data representing acceptable values for each unique surface. A signal output is provided indicative of acceptance or rejection of the chip. Acceptance is based on predetermined statistical confidence intervals calculated from known good regions of the object being tested, or their representative values. The method can utilize a known good chip, a photographic mask from which the I.C. was fabricated, or a computer stored replica of each pattern being tested.

12 Claims, 5 Drawing Figures

CROSS CORRELATION ANOMALY DETECTION SYSTEM

ORIGIN OF THE INVENTION

The invention described herein was made in the performance of work under a NASA contract and is subject to the provisions of Section 305 of the National Aeronautics and Space Act of 1958, Public law 85–568 (72 Stat. 435; 42 USC 2457).

BACKGROUND OF THE INVENTION

This invention relates to automatic testing systems for determing the acceptability or non-acceptability of an integrated circuit by reflected data obtained from its surface, and more particularly to improvements therein.

Microelectronic components intended for use in electronic systems, where reliability and correctness of the circuit layout is a rigorous requirement, require a far more rigorous inspection than the conventional electrical check-out. For example, where such electronic systems are to be used in extended space craft missions, the requirements that the circuit must meet are extremely strict. Over a long mission period, certain physical faults and defects are likely to cause catastrophic failure. Components containing such defects, although electrically qualified, must be weeded out to obtain the degree of reliability required. Visual inspection to detect such faults and defects in micro circuits, are performed by a human inspector. This takes a great deal of time. The probability of human error occurring because of the tedious nature of the assignment, eye strain and the intense concentration required, indicate the desirability for automating visual inspection.

In a copending application, filed for this inventor, entitled "Automatic Visual Inspection System for Microelectronics," filed Sept. 27, 1973, Ser. No. 401,224, there is described a system for automatically comparing a reference and test chip and indicating whether or not the test chip is acceptable. The use of a reference chip, however, can cause problems with specific chips being tested since chips made by different processes, or having had different thermal histories, even though acceptable, exhibit different reflectance properties and hence, even though acceptable, may be rejected.

OBJECTS AND SUMMARY OF THE INVENTION

It is an object of this invention to provide a novel and unique method and means for receiving reflectance data from a surface and automatically evaluating same.

Another object of this invention is the provision of a detection system which accurately evaluates reflectance data, received from a surface which is being inspected, and provides an output indicative of acceptance or non-acceptance of the surface which has been evaluated.

Yet another object of the present invention is the provision of a microelectronic component inspection system which does not require a reference chip or comparison surface but operates from data.

The surface of a chip is comprised of areas of diffusions, areas of metal, areas of oxide, and edges which are transitions from metal to oxide, from oxide to metal, and diffused to non-diffused regions. In accordance with this invention, a chip, from a run of test chips, which has been determined as acceptable, as an example only, has specific oxide areas and specific metal areas scanned by a light beam to provide their reflectance values. Using standard statistical techniques, statistical estimators are then calculated from the reflectance values. These estimators are $\mu$, $\sigma^2$, and $\sigma$. Electrical analogs of these estimators are then entered into a circuit arrangement in a specific way, to which there are also applied reflectance signals from a chip undergoing test. This circuit arrangement performs a cross-correlation between the difference of data and the test chip reflectance data and the test chip reflectance data. It produces an output which is compared with one of three threshold values, as determined by whether the reflectance signal entered from the test chip, at that time, is derived from a metal surface, or from an oxide surface, or from an edge. The threshold values are calculated from data derived by scanning the original chip which is used for calculating the statistical estimators. As a result of such comparison an indication is provided as to whether or not a chip is acceptable and/or the degree of acceptability which was calculated using a predetermined confidence interval.

The above-mentioned circuit arrangement determines the difference between two vector fields, A and B, where the vector A is derived by scanning over a discrete portion of a chip undergoing test and the vector B is the calculated vector. A cross-correlation between the difference between the two vector fields A and B and the vector field under test, or the test chip, is then derived. Then a crosscorrelation is performed between the difference (A–C) with the test chip vector A. C is a calculated rotation of the elements of the matrix used in calculating B. This results in further increasing the sensitivity to small differences between the two. If, for example, matrix B and C are comprised of average values of metal and oxide respectively, this method in effect tests the data in two dimensions for the presence of a valid edge. Since it has been determined that a normal (Gaussian) distribution is applicable to the reflectance data, confidence limits based on the Gaussian distribution can be applied to the test. The computation circuitry produces an output which represents the indicated difference. This is compared with a threshold to produce a signal indicating acceptance or non-acceptance.

The novel features of the invention are set forth with particularity in the appended claims. The invention will best be understood from the following description when read in conjunction with the accompanying drawings.

DESCRIPTION OF THE PREFERRED EMBODIMENT

There follows a discussion of the logic behind an algorithm which is also set forth in the previously referred to application, "Automatic visual Inspection System for Microelectronics," which is provided in order to afford a better understanding of this invention.

In the discussion that follows, the reflectance data obtained by scanning a portion of a line, a whole line, or a series of lines on a chip surface is treated as a vector quantity. Thus, vector A is derived by scanning over some discrete portion of the sample or test chip and vector B is derived by scanning in identical fashion a corresponding portion of a reference chip. An illustration of this is as follows. The scan of a region of a chip which is 2 × 22 provides a vector, A, for example, having values $$\begin{bmatrix} a_1 & a_2 \\ a_3 & a_4 \end{bmatrix}$$

We similarly scan a 2 × 22 region of a reference chip $$\begin{bmatrix} b_1 & b_2 \\ b_3 & b_4 \end{bmatrix}$$

to obtain vector B.

The correlation coefficient between the two fields of the vectors A and B can be expressed as their normalized inner product:

$$\cos \angle^A_B = \frac{A \cdot B}{|A| \; |B|} = \text{correlation coefficient} \quad (1)$$

This is equivalent to saying cos of the angle between $$A \text{ and } B = \frac{\epsilon a_i b_i}{\sqrt{\epsilon a_i^2} \sqrt{\epsilon b_i^2}}$$

The scalar quantity thus obtained can be interpreted as a measure of similarity between A and B, similarity being taken to mean that no significant defect or fault exists, and the extent of dissimilarity may be taken as an indication of the presence of an anomaly which may or may not be significant depending upon some threshold criteria.

This approach, however, does not provide a satisfactory solution when the differences between the vectors are very small. The surface portions represented by vectors A and B are always very similar even in the presence of faults and defects. Another test, such as the ratio of A and B must be made. Its most significant disadvantage is that the detection technique is relatively insensitive to small fields such as a matrix of (1 × 2) and hence yields poor detection results when applied to integrated circuit inspection.

It is apparent that if the sensitivity to small differences could be increased, the number of data points being processed would be minimized, and computing requirements would be simplified. The probability of finding small faults would be enhanced. It would then be possible to perform the necessary arithmetic operations either in analog or digital form using IC modules instead of by use of a high cost computer.

An improved algorithm, which elimates some of the shortcomings of the above effects, is a cross-correlation between the difference between the two vector fields A and B and the suspect vector field, which is the test chip. This may be stated as:

$$\frac{(A-B)}{|A-B|} \cdot \frac{A}{|A|} = \cos \angle^{A-B}_A = \text{correlation coefficient} \quad (2)$$

Sensitivity to small differences is increased, since the test comparison is made against the test chip rather than between two very similar chips, the reference and test chips.

A logical extension of the approach is to crosscorrelate the difference $(A-B)$ with test chip vector A, and also with reference chip vector B. This may be stated as:

$$\frac{(A-B) \cdot A}{|(A-B)| \; |A|} = \cos \angle^{A-B}_A$$

$$\& \; \frac{(A-B) \cdot B}{|(A-B)| \; |B|} = \cos \angle^{A-B}_B \quad (3)$$

Sensitivity to small diferences is further increased because two tests are made, one against the test chip and the second against the reference chip. Computations can be simplified by squaring the terms.

If the difference $(A-B)$ correlates with vector A of the test chip to a greater degree than to vector B of the reference chip and A is greater than B, then it is apparent that the anomaly is sited in the test chip and not in the reference chip. Conversely, if A is less than B then the angle between the difference vector $(A-B)$ and vector A is again smaller than the angle between $(A-B)$ and vector B. However, the dot product of the right hand number of equation (3) is greater than the left and a negative resultant is obtained. Thus, the sign of the arithmetic difference between the correlation coefficients is a definite indicator of the source and nature of the difference between vector fields A and B, and the magnitude of this value can be interpreted as a measure of disimilarity. It is possible to assign a threshold which indicates the significance of the anomaly. It is also possible to classify the defect. Thus, the detection algorithm may be stated as:

$$\left[ \cos \angle^{A-B}_A \right]^2 - \left[ \cos \angle^{A-B}_B \right]^2 = \Gamma_i \quad (4)$$

| Condition | Fault Location | ± Output |
|---|---|---|
| Case 1  $A<B$ | B | Not required, B is reference |
| Case 2  $A>B$ | A | Positive |
| Case 3  $A>B$ | B | Not required, B is reference |
| Case 4  $A<B$ | A | Negative |

A system which operates in accordance with the foregoing algorithm is shown, described and claimed in the aforesaid application "Automatic Visual Inspection System for Microelectronics." In accordance with this invention, a single chip is selected from a run of a manufacturing process to be tested. Data to be used for testing is derived from this chip, which has been optically determined to be acceptable. Thus, an arrangement in accordance with this invention makes a reference chip unnecessary.

The transfer function of a tuned detector (output versus input) suitable for the indicated purpose, again, may be mathematically expressed as:

$$\text{Output} = \cos^2 \angle \frac{A-KB}{A} - \cos^2 \angle \frac{A-KC}{A} \quad (5)$$

where this time, $A$ equals the reflectance data from a chip, undergoing a test, (this may be a $1 \times 2$, a $2 \times 2$ vector, or even a $3 \times 3$ vector).

B equals measured reflectance data from a chip, selected, as indicated above, which is used to calculate the average vector components. It should have the same number as is used for obtaining the vector A representative of the metal to oxide transition. An empirically determined constant $K$ is then applied as a multiplier to optimize the value of $B$ and $C$.

Exemplary of this, a number of reflectance readings are taken from the metal surface of the chip (M) and the oxide surface of the chip (O). From this information an average value for the metal and oxide are inserted in the matrix $$\begin{bmatrix} O & M \\ M & O \end{bmatrix} = B.$$

When each of the terms of this matrix are used subsequently in calculations, they are multiplied by the constant $K$.

$C$ equals a rotation of the $2 \times 2$ or $3 \times 3$ elements calculated for $B$, i.e., $$\begin{bmatrix} M & O \\ O & M \end{bmatrix} = C.$$

As with $B$, when the matrix terms are used in calculations, they are multiplied by $K$.

With this arrangement, it is necessary to calculate a threshold, or the upper and lower limits which a chip being scanned must pass, i.e., for its metal regions, for its oxide regions, and for its edge regions. Such threshold calculation is made using the following formula:

$$\text{Threshold} = \tan^{-1} \frac{\bar{\mu} \pm k\sigma}{\bar{\mu} \mp k\sigma}. \quad (6)$$

Where $\bar{\mu}$ is the average value for metal, or oxide, whichever is being calculated, $\sigma$ is the standard deviation estimator, for metal or oxide, whichever is being calculated. The data for both of these is derived from the data obtained for calculating $B$. "$K$" is a coefficient determined by the confidence value desired (e.g., 1.96 $= k$ for 95% confidence).

Figure 1:
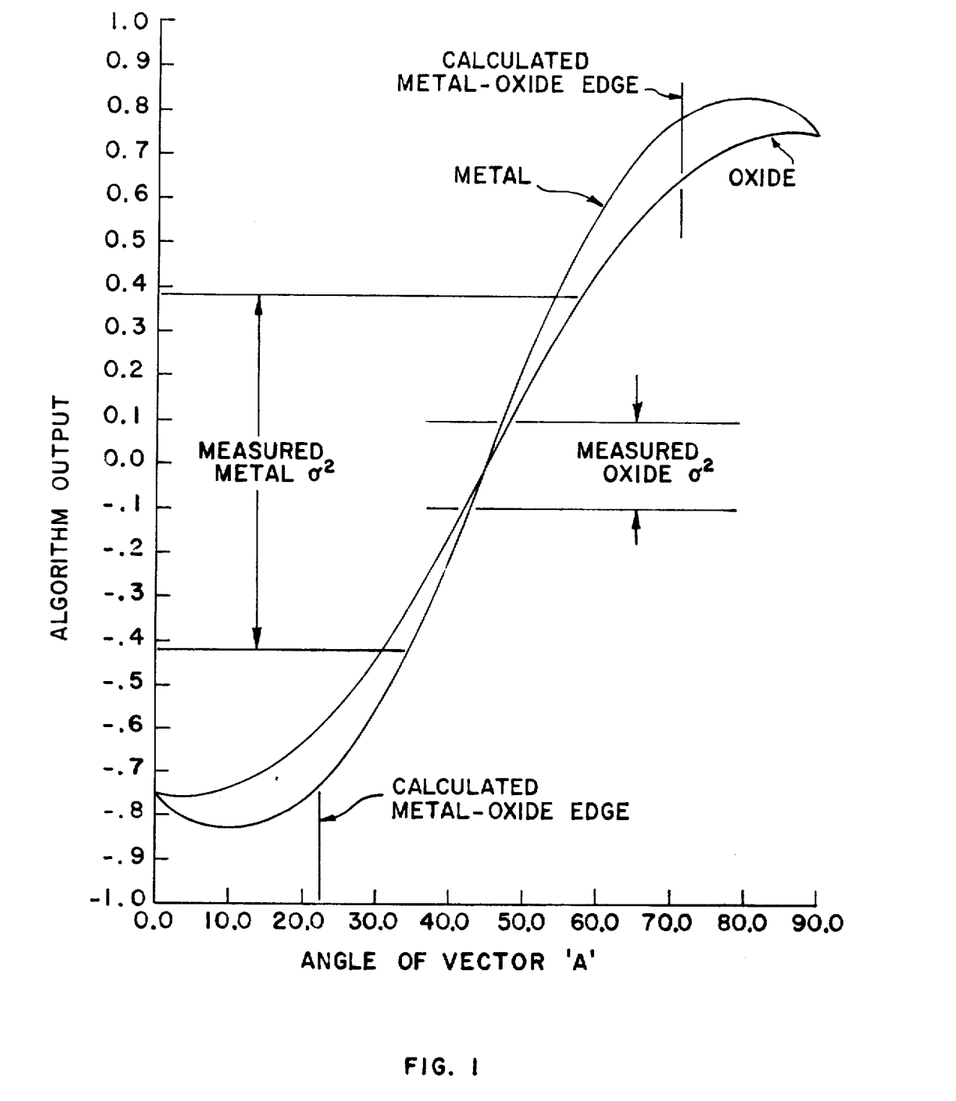
FIG. 1 is a curve illustrating the transfer function of a tuned detector, in accordance with this invention.

If, after the values of $B$ and $C$ have been determined, values for the A vector are assumed for reflectance from oxide and then for reflectance from metal, ranging from a minimum angle to 90°, and a value of $K$ (such as 4) is assumed, then a solution to the algorithm shown in equation 5 is obtained, which is plotted against the values assumed for $A$. The resulting curves for metal and oxide are shown in FIG. 1 of the drawings. The value of $K$ selected determines the closeness of the approach of the curves to the vertical. That is, for $K$ equals 1, the curves approach a horizontal line more than they do a vertical line, thus the sensitivity of a detector, whose transfer function these curves represent, may be altered by the value selected for $K$.

The algorithm outputs over an acceptable range for metal and for oxide, which was actually measured, is also shown in FIG. 1, as well as the locations of calculated metal-oxide or oxide-metal edges or transitions.

Figure 2A:
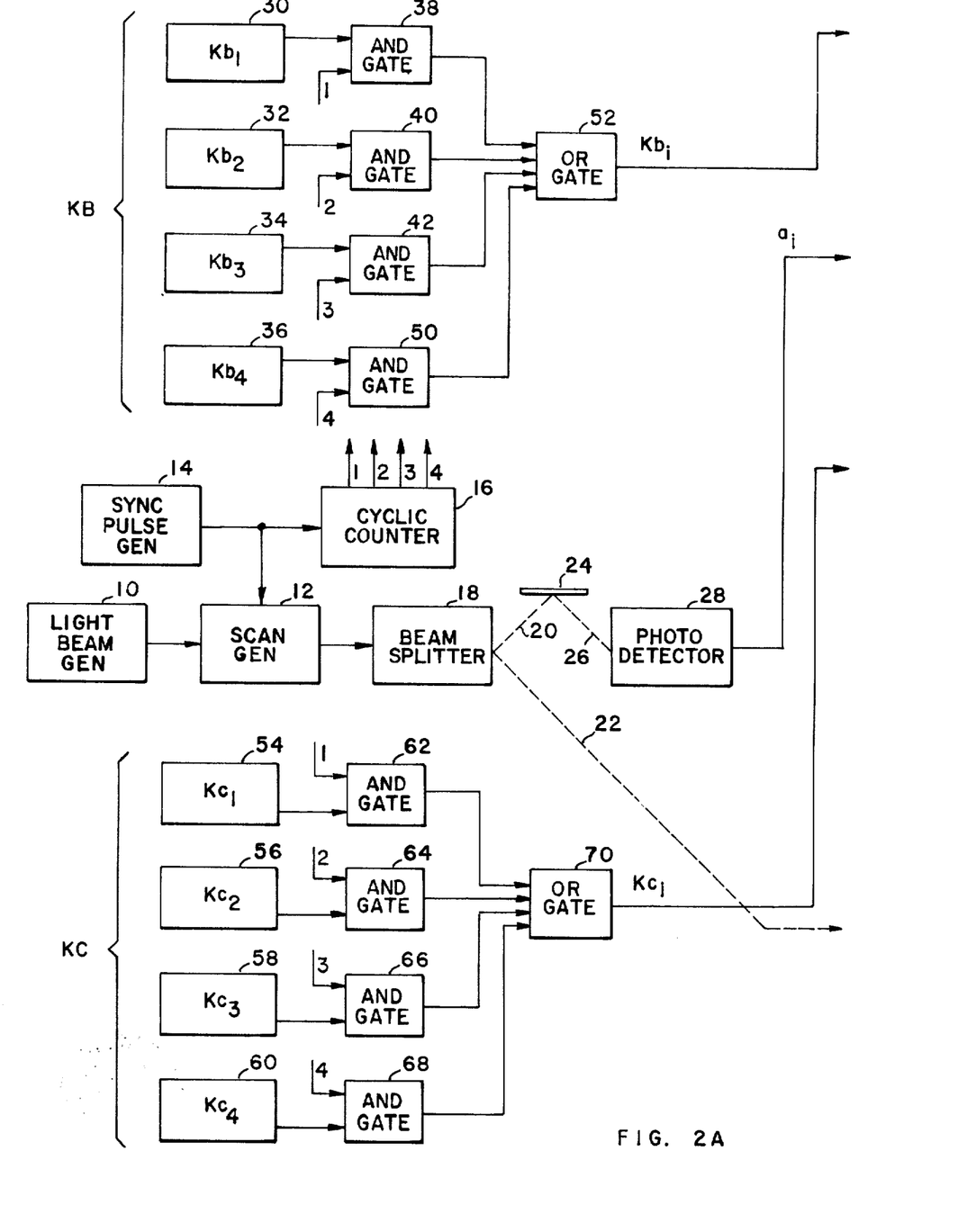
FIG. 2a and 2b taken together is a block schematic diagram of one embodiment of this invention.
Figure 2B:
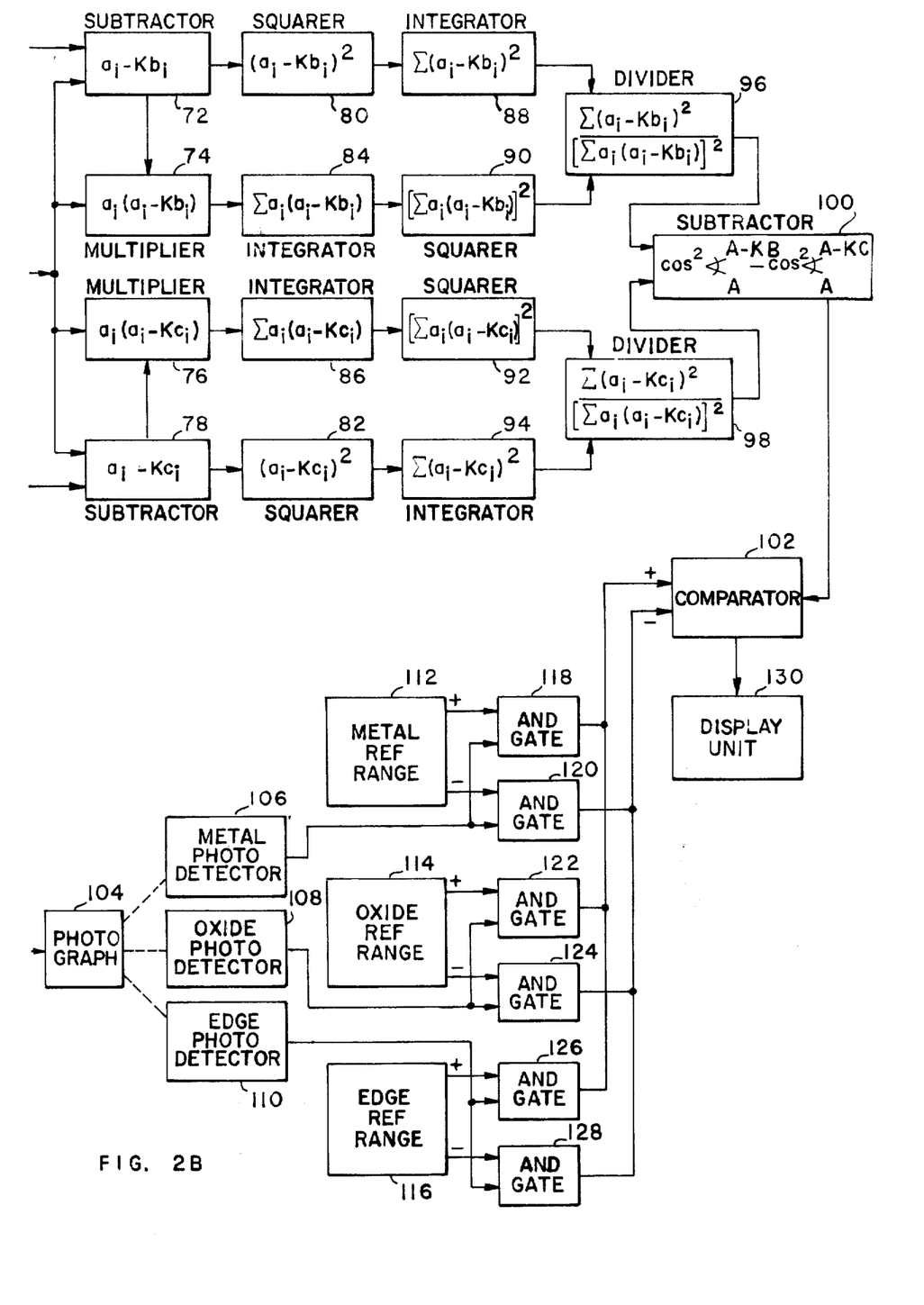

Referring now to FIG. 2 of the drawings, there may be seen a schematic drawing of one embodiment of the invention, which compares the data derived, as explained above with a chip under test. Any arrangement for producing two scanning light beams wherein the diameter of one of the light beams is small enough to scan the details of the topography of the surface of a microelectronic chip, may be employed. A further requirement is that provision must be made for obtaining the reflectance beam. A suitable arrangement is described and shown in the previously mentioned application, "Automatic Visual Detection System for Microelectronics,"by this inventor.

A light beam generator 10 has its output directed at a scanning generator 12. The scanning generator is any suitable arrangement, either of mirrors or crystals, which can cause a light beam to have a desired scanning motion. The scanning generator 12 is driven in response to the output pulses from a sync pulse generator 14. The sync pulse generator output, which causes the scanning generator to move an increment of motion for each pulse, also drives a cyclic counter 16.

The scanning generator output is applied to a beam-splitter, 18, which causes the light beam received from the scanning generator to be split into two scanning beams respectively 20, 22. The light beam 20 is directed at the surface of a microelectronic circuit chip 24, causing a reflectance beam 26, which is directed at a photo-detector 28.

The items constituting the matrix B, are each respectively represented by the values $b_1$, $b_2$, $b_3$, and $b_4$, which are determined in the manner previously described. Each one of these is multiplied by the constant $K$, which is the empirically determined constant applied as a multiplier to optimize the performance of the detector. Thus, in FIG. 2, the rectangles respectively 30, 32, 34, 36, each comprises a source of potential, such as a battery connected across which there is a potentiometer. The output of each of the potentiometers is established to provide a voltage having an amplitude respectively equal to $Kb_1$, $Kb_2$, $Kb_3$, and $Kb_4$. These outputs are respectively connected as a first input to And gates 38, 40, 42, and 50. All of the And gates outputs are applied to an Or gate 52.

The second required input to the respective And gates 38 through 50 comprises the respective output counts of the cyclic counter 16, respectively counts 1, 2, 3, and 4. Thus, as the light beam 20 scans the surface of the chip 24, and such scan should have the same scan pattern as the scan on the original chip from which the values for the $B$ matrix were derived, a value of the $B$ matrix will be provided for each element of the test chip which is scanned. The output of the Or gate 52 is designated as $Kb_i$. The output of the photo-detector 28, which is derived from scanning the test chip, is designated as $a_i$.

The calculated values of the C matrix, are respectively designated as $c_1$, $c_2$, $c_3$, and $c_4$ and each one of these is multiplied by the empirically determined constant $K$. Thus, each one of the rectangles 54, 56, 58, and 60 represents a potential source having a value determined by the value of the respective $Kc_1$, $Kc_2$, $kc_3$, and $Kc_4$. Each one of these potentials is respectively applied to an And gate respectively 62, 64, 66, and 68. The second input to these And gates constitutes the counts 1, 2, 3, and 4, respectively, from the counter 16. The outputs of all of these And gates is collected by an Or gate 70. The output of the Or gate 70 is designated as $kc_i$.

From the foregoing, it will be seen that for each elemental input $a_i$ to the subsequent circuitry, there is an elemental input $Kb_i$ and $Kc_i$ which has been calculated from information derived from a chip.

The output of the photo-detector, is applied to a subtractor 72, a multiplier 74, a multiplier 76, and a subtractor 78. A second input to subtractor 72 is the output of the Or gate 52. A second input to the subtractor 78 is the output of the Or gate 70. The subtractor 72 applies its output, constituting $a_i - Kb_i$ to a squarer circuit 80, and also is a second input to the multiplier circuit 74. The output of subtractor 78, constituting $a_i - Kc_i$ is applied to a squarer circuit 82, and also to the multiplier circuit 76. The output of the multiplier circuit 74, constituting $a_i(a_i - kb_i)$, is applied to an integrator 84. The output of the multiplier 76, constituting $a_i(a_i - Kc_i)$, is applied to an integrator 86.

The output of the squarer 80, constituting $(a_i - Kb_i)^2$ is applied to another integrator 88. The output of integrator 84, comprising $\Sigma a_i(a_i - Kb_i)$ is applied to a squarer circuit 90. The output of the integrator 86, comprising $93\ a_i(a_i - Kc_i)$ is applied to an integrator 92. The output of the squarer circuit 82, comprising $(a_i - Kc_i)^2$ is applied to an integrating circuit 94.

The output of the integrator 88, comprising $\Sigma(a_i - Kb_i)^2$ is applied to a divider 96. The output of the squarer 90, comprising $[\Sigma a_i(a_i - Kb_i)]^2$ is applied to the divider 96. The output of the integrator 92, comprising $[\Sigma a_i(a_i - Kc_i)]^2$ is applied to a divider 98. The output of the integrator 94, comprising $\Sigma(a_i - Kc_i)^2$ is applied to the divider 98.

The outputs of the respective dividers 96 and 98, constitute the first and second terms or functions which are shown in equation (5) in the application. These are applied to a subtractor 100. The output of the subtractor constitutes a signal which represents the correlation factor of the chip 24 relative to the data B and C. The circuitry described thus far represents a detector circuit whose transfer function is represented in FIG. 1. It yet remains to be determined whether or not the calculated correlation factor is within the range of acceptability which has been calculated. To determined this, the output of the subtractor 100 is applied as one input to a comparator 102. The comparator compares the value of this signal, which can have a positive or negative value with two inputs which establish the range of acceptability for metal, for oxide, or for edge.

The second light beam 22, from the beamsplitter 18, is used to scan a reproduction 104. This reproduction may be, for example, a photograph, in color, of the surface of an acceptable chip, for example, the chip or chips which were used for calculating the B matrix values. It provides topographic information indicative of when the scanning light beam is scanning the metal region of the surface, or the oxide region of the surface, or the edge region of the suface. Such information may also be provided by the mask used in the manufacture of the chip. All that is required is that the indicated information be provided in a manner so that the light which passes through photograph 104 if it is a transparency or which is reflected from the surface if it is not a transparent photograph, can be detected by either a metal photo-detector 106, an oxide photo-detector 108, or an edge photo-detector 110. If the photograph is in color, this is quite simple since color filters may be used with each photo-detector so that only the color associated with the metal, oxide, or edge will pass through to the associated photo-detector. If the photograph is black and white, then an amplitude detection system must be employed wherein the output of a single photodetector is amplitude detected to produce three different level signals which are the three unique signals.

Figure 3:
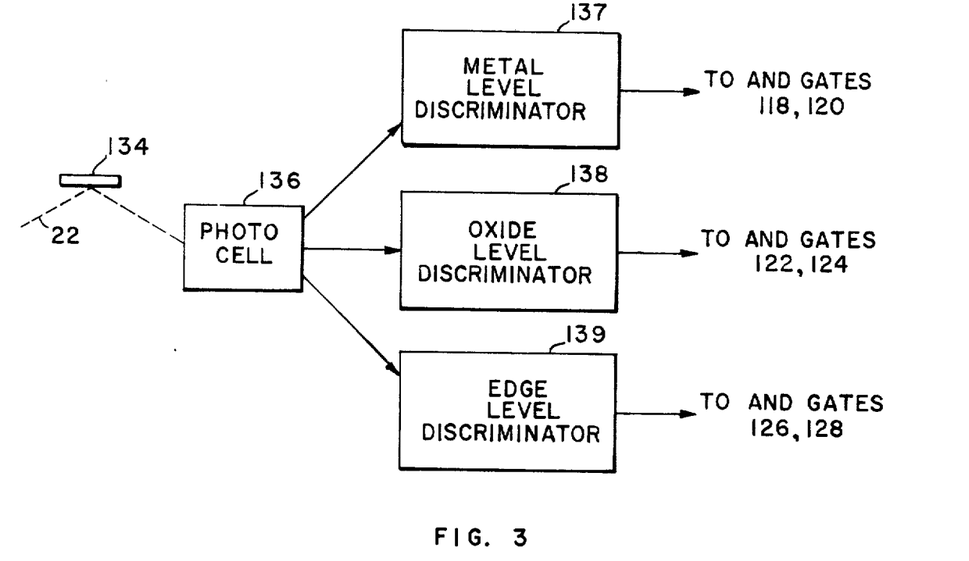
FIG. 3 is a modification of FIG. 2 in accordance with this invention.

If desired, a reference chip may be used to provide the desired "geographic" information. Discrimination as to whether the light reflected from the surface of a reference chip emanates from a metal, oxide or edge region may be done by looking at the amplitude of the reflected signal. The high amplitude signal is reflected from the metal region and is used to enable gates 118 and 120, when it is detected. A signal derived from the oxide region is lower in amplitude than the one derived from the metal region and is used to enable gates 122, 124. The edge region are usually diffuse and the amplitude of the signal obtained is between that obtained from metal and oxide regions. This is used to enable gates 126 and 128. FIG. 3 illustrates how this may be done. The surface of the reference chip 134 (which may also represent an opaque photograph) is scanned by the second light beam 22 simultaneously with the scanning of the surface of the chip under test. Photocell 136 converts the amplitude modulated light signals it receives into electrical signals. These signals are applied to three level discriminators respectively 137, 138 and 139 for metal oxide and edge. These discriminators provide output signals which can be used to enable one of the three sets of And gates when they receive the proper input signal indicative of an oxide, metal or edge region being scanned.

The ranges of acceptance, which have been calculated, in accordance with equation (6) for metal, oxide, or edge, are represented as the range of voltages between positive and negative potentials whose levels are set by potentiometers connected across suitable voltage supply sources. The metal reference range positive and negative potentials are represented by the rectangle 112. The oxide reference range positive and negative potentials are represented by the rectangle 114. The edge reference range positive and negative potentials are represented by the rectangle 116.

The positive output from the rectangle 112 is applied to an And gate 118. The negative output of the rectangle 112 is applied to an And gate 120. The positive output of the rectangle 114 is applied to an And gate 122. The negative output of the rectangle 114 is applied to an And gate 124. The positive output of the rectangle 116 is applied to an And gate 126. The negative ouput of the rectangle 116 is applied to an And gate 128.

The enabling input to the And gates 118 and 120 is the output of the metal photo-detector 106. An enabling input to the And gates 122 and 124 is the output of the oxide detector 108. An enabling input to the And gates 126 and 128 is the output of the edged photo-detector 110.

The positive outputs from And gates 118, 122 and 126 are connected together and applied to a positive input of the comparator 102. The negative outputs of the And gates 120, 124 and 128 are connected together and applied to the comparator 102.

The comparator 102 may comprise any arrangement for determining whether or not an input voltage is within the range limits established between a positive and a negative voltage. This is a well known type of comparison, and may be performed, for example, by using two differential amplifiers, one of which is biased by the positive input from the And gates so that in order for it to provide an output, the input from the subtractor 100 must exceed a positive bias. The other differential amplifier is biased by the negative input from the And gate in such a manner so that the amplifier will not provide an output unless the input received from the subtractor exceeds that negative bias. Thus, in the absence of an output signal, the test chip is acceptable. A display unit, 130, receives the output of the comparator 102 and provides an indication that can be any desired type of signal in response to an input signal, indicative of the fact that the chip under test is defective. The display unit can be a light display or a cathode ray tube display, or even a counter which counts the number of times a chip being scanned is out of tolerance.

Figure 4:
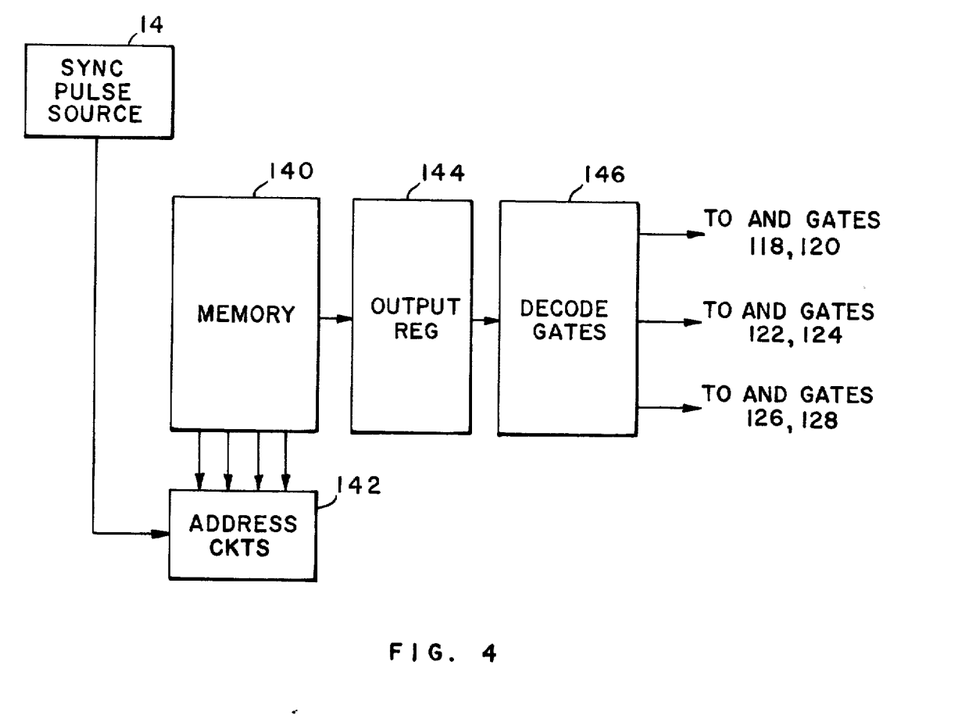
FIG. 4 is also a modification of FIG. 2 in accordance with this invention.

FIG. 4 is a block schematic drawing of a modification of FIG. 2, in accordance with this invention. It is perfectly feasible to store the topographic data as a series of numbers, representing a chip surface in a computer memory. Such data is stored in memory 140. One number represents metal, another oxide and a third edge. These numbers are stored in locations in memory so that they can be called out in a correct sequence as the test chip is being scanned. Signals from the sync pulse source 14, which is the same source as shown in FIG. 2, are applied to the address circuits 142 of the memory which causes the memory 140 to sequentially read out into an output register 144, the numbers indicative of whether the beam scanning the test chip should be on metal, oxide or edge.

Decode gates 146 decode each of the digital numbers in the output of the output register into one of three signals. This can be a signal indicative that a metal surface should be scanned at that time, which signal will enable gates 118 and 120, or indicative that an oxide surface should be scanned at that time, which enables gates 122, 124, or indicative that an edge region should be scanned, which enables gates 126, 128.

The remainder of the circuits are as shown in FIG. 2. The circuits in FIG. 4 climate the need for a second scanning beam, a photograph or chip and the metal, oxide and edge, photo-detectors, respectively 106, 108, and 110.

It should be appreciated that all of the circuits shown in FIG. 2, that is, the circuits for providing the $Kb_i$ signals and the $Kc_i$ signals, as well as the "topographic" signals (as shown in FIG. 4), the detector circuits, and the comparator and its associated circuits may all be encompassed within a digital computer and the entire comparison process can be carried out by programming the computer properly. This would require the establishment of $Kb_i$, $Kc_i$ and the reference range signals as digital signals, which are stored in memory and called out for use in the manner described. The output of photo-detector 28 is applied to an analog to digital computer, the output of which is entered into the computer. Also required for entry are the synchronizing signals out of sync pulse generator 14.

From the foregoing, it should be appreciated that the system described does not need an integrated circuit as a reference, it need only know the principle surface it should be investigating. The circuit arrangement is "tuned" for inspecting a particular type of surface produced by a particular type of heat treatment by the calculated information derived from the data obtained by scanning an acceptable sample of a run. In this manner, the inspection arrangement is optimized.

There has accordingly been described and shown herein, a novel and useful arrangement for determining the acceptability of a microcircuit chip, automatically, employing data in place of a reference chip.

What is claimed is:

1. In a system for inspecting the surface of a test chip by deriving reflectance signals from a reflectance beam caused by scanning the surface of said test chip with a scanning light beam, using, as criteria for such inspection, data derived from an acceptable chip or chips, said data being in the form of a plurality of calculated terms arranged in a predetermined pattern in a first matrix, a rotation matrix of said first matrix, and acceptable ranges for metal, oxide and edge regions of said chip, the improvement comprising means for generating a plurality of first signals each representative of the product of $K$ and a different on of said terms in said first matrix, where $K$ is a constant selected to provide a desired inspection sensitivity, means for generating a plurality of second signals each representative of the product of $K$ and a different one of said terms in said rotation matrix, means for generating a plurality threshold signals respectively representative of said acceptable ranges for metal, oxide and edge regions, means for simultaneously and sequentially selecting each of said plurality of first signals and said second signals as each element of the surface of said test chip is scanned by said scanning beam, means for representing the surface regions of an acceptable chip, means for deriving from said means for representing the surface regions of an acceptable chip in synchronism with the surface scan of said test chip signals representative of the region of the surface of an acceptable chip that should be scanned at that time by said scanning light beams, means responsive to said signals representative of the region of the surface of an acceptable chip for selecting the threshold signals for the region represented from said means for generating a plurality of threshold signals, means responsive to said first signals, said second signals and to said reflectance signals from said chip for generating a first function signal representative of the function and a second function signal representative of the function $$\cos^2 \angle (A, KB) = \frac{\Sigma(a_i - Kb_i)^2}{|\Sigma a_i(a_i - Kb_i)|^2}$$

where $a_i$ represents said reflectance signals, $b_i$ represents said first signals, $c_i$ represents said second signals and $K$ is said sensitivity constant,
  means for subtracting the first function signal from the second function signal to produce a difference signal, and
  means for comparing said difference signal with said selected threshold signals for determining whether or not said chip passes inspection.

2. In a system as recited in claim 1 wherein said means for representing the surface regions of an acceptable chip includes a photographic representation of an acceptable chip.

3. In a system as recited in claim 1 wherein said means for representing the surface regions of an acceptable chip comprise means for storing signals representative of the surface of an acceptable chip in a distribution corresponding to that of said surface region.

4. In a system as recited in claim 1 wherein said means for representing said surface regions of an acceptable chip comprises an acceptable chip.

5. In a system for inspecting the surface of a test chip by deriving reflectance signals from a reflectance beam caused by scanning the surface of said test chip with a scanning light beam, using, as criteria for such inspection, data derived from an acceptable chip, or chips, said data being in the form of a plurality of calculated terms arranged in a predetermined pattern in a first matrix, a rotation matrix of said first matrix, and acceptable ranges for metal, oxide and edge regions of said chip, the improvement comprising
  means for generating first signals each representative of the product of $K$ and a different one of the calculated terms in said first matrix, where $K$ is an empirically determined sensitivity constant,
  means for generating second signals each representative of the product of $K$ and a different one of the terms in said rotation matrix,
  meant for generating a plurality of threshold signals respectively representative of said acceptable ranges for said metal, oxide and edge regions of said chip,
  means for simultaneously selecting said first signals and said second signals sequentially as each element of the surface of said test chip is scanned by said scanning beam,
  means for selecting the threshold signals corresponding to an acceptable range for the part of the surface of the test chip being scanned,
  means responsive to said first signals, said second signals and to said reflectance signals from said chip for generating a first function signal representative of the function and a second function signal representative of the function $$\cos^2 \angle (A, KC) = \frac{\Sigma(a_i - Kc_i)^2}{|\Sigma a_i(a_i - Kc_i)|^2}$$

where $a_i$ represents said reflectance signals, $b_i$ represents said first signals, $c_i$ represents said second signals and $K$ is said sensitivity constant,
  means for subtracting the first function signal from the second function signal to produce a difference signal, and
  means for comparing said difference signal with said selected threshold signals for determining whether or not said chip passes inspection.

6. In apparatus as recited in claim 5 wherein said means for generating said first function signal includes
  means for subtracting said first signal from said reflectance signal to produce a first difference signal,
  means for multiplying said reflectance signal with said first difference signal to produce a first product signal,
  means for squaring said first difference signal to produce a first squared signal,
  means for integrating said first squared signal to produce a first integrated signal,
  means for integrating said first product signal to produce a second integrated signal,
  means for squaring said second integrated signal to produce a second squared signal, and
  means for dividing said first integrated signal by said second squared signal to produce said first function signal.

7. In apparatus as recited in claim 5 wherein said means for generating said second function signal includes
  meant for subtracting said second signal from said reflectance signal to produce a second difference signal,
  means for multiplying said second difference signal by said reflectance signal to produce a second product signal,
  means for integrating said second product signal to produce a third integrated signal,
  means for squaring said third integrated signal to produce a third squared signal,
  means for squaring said second difference signal to produce a fourth squared signal,
  means for integrating said fourth squared signal to produce a third integrated signal, and
  means for dividing said third squared signal by said fourth integrated signal to produce said second function signal.

8. In a system as recited in claim 5 wherein said means for selecting said threshold signals includes a transparency constituting a representation of the surface of said test chip wherein the metal regions, the oxide regions and the edge regions produce a separately identifiable modulation of light passing through said transparency, means for scanning said transparency with a light beam simultaneously and in synchronism with the scanning of said test chip, means for detecting the modulated light beam passing through said transparency and producing a metal identifying signal, or an oxide identifying signal, or an edge identifying signal in response thereto, and means responsive to the one of said identifying signals which is obtained for selecting the associated threshold signals to be applied to said means for comparing.

9. In a system as recited in claim 5 wherein said means for selecting said threshold signals includes means for storing signals representative of the surface regions of an acceptable chip in a distribution corresponding to that of said surface regions, means for sequentially reading out of said memory said signals representative of the surface regions of said acceptable chip while simultaneously scanning the surface of said test chip, and means responsive to each one of said signals representative of the surface regions which is read out of said memory for selecting the associated threshold signals to be applied to said means for comparing.

10. In a system for inspecting the surface of a test chip by deriving reflectance signals from a reflectance beam caused by scanning the surface of said test chip with a scanning light beam, using, as criteria for such inspection, data derived from an acceptable chip or chips, said data being in the form of a plurality of calculated terms arranged in a predetermined pattern in a first matrix, a rotation matrix of said first matrix, and acceptable ranges for metal, oxide and edge regions of said chip, the improved inspection method comprising generating a plurality of first signals each representative of the product of $K$ and a different one of said terms in said rotation matrix, where $k$ is a constant selected to provide a desired inspection sensitivity, generating a plurality of second signals each representative of the product and a different one of said terms in said transpose matrix, generating a plurality of threshold signals respectively representative of said acceptable ranges for metal, oxide and edge regions, simultaneously and sequentially selecting each of said plurality of first and second signals as each element of the surface of said test chip is scanned by said scanning beam, generating in synchronism with the surface scan of said test chip signals representative of the region of the surface of an acceptable chip that should be scanned at that time by said scanning light beam, selecting the threshold signals indicated by said signals representative of the region of the surface of an acceptable chip that should be scanned at that time, generating, responsive to said first and second signals and to said reflectance signals from said chip, a first function signal representative of the function $$\cos^2 \angle_A^{(A-KB)} = \frac{\Sigma(a_i - Kb_i)^2}{|\Sigma a_i(a_i - Kb_i)|^2},$$

and a second function signal representative of the function $$\cos^2 \angle_A^{(A-KC)} = \frac{\Sigma(a_i - Kc_i)^2}{|\Sigma a_i(a_i - Kc_i)|^2},$$

where $a_i$ represents said reflectance signals, $b_i$ represents said first signals, $c_i$ represents said second signals and $K$ is said sensitivity constant, subtracting said first function signal from said second function signal to produce a difference signal, and comparing said difference signal with said selected threshold signals for determining whether or not said chip passes inspection.

11. In a system as recited in claim 10 wherein said step of generating in synchronism with the surface scan of said test chip signals, signals representative of the region of the surface of an acceptable chip that should be scanned at that time comprises scanning a photographic representation of an acceptable chip with another light beam in synchronism with the scanning of the surface of said test chip to provide light signals modulated by said photographic representation, detecting said modulated light signals to provide signals indicative of either an oxide region or metal region or edge region being scanned.

12. In a system as recited in claim 10 wherein said step of generating in synchronism with the surface scan of said test chip signals, signals representative of the region of the surface of an acceptable chip that should be scanned at that time comprises storing signals representing the surface of an acceptable chip, and reading said stored signals out in synchronism with the scanning of the surface of said test chip.

* * * * *

UNITED STATES PATENT OFFICE
CERTIFICATE OF CORRECTION

Patent No. 3,908,118  Dated September 23, 1975

Inventor(s) Ernest Z. Micka

It is certified that error appears in the above-identified patent and that said Letters Patent are hereby corrected as shown below:

Column 7, line 38, "93 $a_i(a_i - Kc_i)$" should read -- $\Sigma a_i(a_i - Kc_i)$ --; lines 59 and 60, "determined" should read -- determine --. Column 10, line 38, "on" should read -- one --; line 58, "beams" should read -- beam --. Column 11, line 53, "meant" should read -- means --. Column 12, line 44, "meant" should read -- means --.

Signed and Sealed this sixteenth Day of December 1975

[SEAL]

Attest:

RUTH C. MASON  
*Attesting Officer*

C. MARSHALL DANN  
*Commissioner of Patents and Trademarks*